United States Patent [19]

Fujioka et al.

[11] 4,382,072

[45] May 3, 1983

[54] CATALYTIC PREPARATION OF SULFURYL FLUORIDE

[75] Inventors: George S. Fujioka, Walnut Creek; Danae A. Vanderhoof, Concord, both of Calif.

[73] Assignee: The Dow Chemical Company, Midland, Mich.

[21] Appl. No.: 321,868

[22] Filed: Nov. 16, 1981

[51] Int. Cl.³ .............................................. C01B 17/45
[52] U.S. Cl. ................................................... 423/468
[58] Field of Search ........................................ 423/468

[56] References Cited

U.S. PATENT DOCUMENTS

| | | | |
|---|---|---|---|
| 2,285,277 | 6/1942 | Henke et al. | 252/218 |
| 2,777,805 | 1/1957 | Lefrancois et al. | 196/50 |
| 3,092,458 | 6/1963 | Ruh et al. | 23/203 |
| 3,714,336 | 1/1973 | Davis et al. | 423/468 |
| 3,736,265 | 5/1973 | Suggitt | 252/445 |
| 3,736,266 | 5/1973 | Schrage | 252/447 |
| 3,737,395 | 6/1973 | Arnold et al. | 252/447 |
| 3,804,779 | 4/1974 | Kent et al. | 252/447 |
| 3,996,029 | 12/1976 | Gustafson et al. | 55/71 |
| 4,087,377 | 5/1978 | Fujioka et al. | 252/415 |
| 4,102,987 | 7/1978 | Cook et al. | 423/466 |

FOREIGN PATENT DOCUMENTS 805874 12/1958 United Kingdom ................ 423/468

OTHER PUBLICATIONS

*Chemical Abstracts*, vol. 70, (1969) No. 83836w.

*Primary Examiner*—Brian E. Hearn
*Attorney, Agent, or Firm*—M. L. Glenn

[57] ABSTRACT

The use of a supported, metal catalyst in the reaction of $Cl_2$, HF and $SO_2$ increases production of sulfuryl fluoride and reduces the formation of by-products relative to charcoal catalysts employed in the prior art. Palladium on carbon catalysts have been found to be particularly active.

6 Claims, No Drawings

CATALYTIC PREPARATION OF SULFURYL FLUORIDE

BACKGROUND OF THE INVENTION

This invention relates to an improved process for the preparation of sulfuryl fluoride. In particular, a process is disclosed in which a metal-impregnated support is utilized as a catalyst.

U.S. Pat. Nos. 2,772,144, 3,092,458 and 3,320,030 teach that sulfuryl fluoride can be prepared by passing sulfur dioxide, chlorine and hydrogen fluoride over an activated charcoal catalyst. U.S. Pat. Nos. 3,714,336 and 4,087,377 teach the regeneration of activated charcoal catalyst used in sulfuryl fluoride production.

The processes employed in the prior art to prepare sulfuryl fluoride also produce a significant quantity of undesirable thionyl fluoride as a by-product. A method for preparing sulfuryl fluoride which reduces the quantity of thionyl fluoride by-product produced would be advantageous.

SUMMARY OF THE INVENTION

In accordance with this invention, sulfur dioxide, chlorine and hydrogen fluoride are contacted at reactive conditions in the presence of an effective amount of a palladium, platinum, rhodium, rhenium, vanadium or chromium catalyst on a compatible support, so as to prepare sulfuryl fluoride. The term "effective amount" as used herein indicates that the presence of the metal in this amount increases the reaction rate, permits the use of lower operating temperatures while maintaining the same reaction rate or improves the selectivity of the subject reaction relative to the same reaction in the presence of the carbon supporting material sans metal.

DETAILED DESCRIPTION OF THE INVENTION

The preparation of sulfuryl fluoride by the catalyzed reaction of sulfur dioxide, chlorine and hydrogen fluoride is a well-known process. The aforementioned improved catalyst promotes this reaction at lower temperatures and with greater selectivity than the activated charcoal catalyst employed in the prior art.

The metal or metallic salt employed as a catalyst is selected from the group consisting of palladium, platinum, rhodium, ruthenium, vanadium and chromium. These catalysts can be present as metals (i.e., in a zero oxidation state) or as oxide or halide salts of these metals. Preferred as catalysts are platinum, palladium, rhodium or ruthenium metals used singly or in combination. Vanadium oxide and chromium oxide are also preferred. Most preferred as a catalyst is palladium metal. The catalyst composition can optionally contain other materials as activators, such as iron or nickel oxide.

The metal or metal salt catalyst is advantageously present on a carrier. This carrier can consist of alumina, dolomite, magnesium carbonate, carbon or other support materials which do not interfere with the desired reaction. Activated carbon is the catalyst support of choice. The carbon support may act as a co-catalyst with the metal. The catalyst support particles are desirably large enough so as not to appreciably impede gas flow but small enough to minimize large voids. Preferably, the catalyst support is from about 2 to about 20 mesh, more preferably about 5 to about 10 mesh (U.S. Sieve size).

The loading of the catalyst on the support is not generally critical so long as sufficient metal catalyst is present to facilitate the preparation of the sulfuryl fluoride. Preferably, the catalyst is employed in a weight concentration of from about 0.1 to 25 percent, more preferably from about 0.5 to about 10 percent, of the total weight of the supported catalyst.

The method by which the supported catalyst is prepared is not necessarily critical. Operable methods for the preparation of these supported catalysts are described in U.S. Pat. Nos. 2,823,325, 3,265,636 and 3,271,327, as well as in other standard references in the art. Such supported catalysts are also available commercially. Generally, it is advantageous to condition the catalyst by preheating it to about 300° C. for 1 hour under a nitrogen atmosphere prior to use.

The subject metal catalysts generally exhibit the most favorable activity at temperatures in the range from about 145° to about 220° C., more preferably about 150° to about 200° C. At temperatures below temperatures in these preferred ranges, although the catalyst is still active, the reaction rate drops sharply. At temperatures greater than those in the aforementioned preferred ranges, production of the undesirable thionyl by-product increases.

The pressure employed is preferably slightly greater than atmospheric pressure. Pressures from about 1 to about 100 atmospheres are operable.

Conveniently, the reactants are employed in roughly stoichiometric amounts in accordance with the overall reaction $$Cl_2 + SO_2 + 2HF \rightarrow SO_2F_2 + 2HCl.$$

It is preferable to use a reaction mixture deficient in chlorine to minimize the quantity of unreacted chlorine in the product. More preferably, the reactants are present in mole ratios of from about 3:1 to about 3.5:1 for HF:$Cl_2$ and from about 2:1 to about 3:1 for $SO_2$:$Cl_2$.

The time required for essentially complete reaction will vary depending on the identity of the catalyst, the surface area of the catalyst, the ratio of reactants and the reaction temperature. Typically, reaction times as short as 1 second or as long as 1 minute are operable to effect essentially complete reaction. The flow rate of the reactant gases are adjusted to afford contact with the catalyst for a period sufficient to effect essentially complete reaction.

The activity of the subject catalysts declines gradually with use over a period of time. This activity can be regenerated by treating the spent catalyst with a hydrogen fluoride stream at a temperature of from about 450° to about 550° C. in the general manner taught in U.S. Pat. No. 3,714,336. Generally, regeneration should be affected when the conversion of reactants to product declines by about 0.5 percent. The conversion is readily determined by the percentage of $Cl_2$ in the product. The chlorine concentration in the product should not exceed 5000 ppm.

Sulfuryl fluoride can be separated from the product mixture by fractional distillation and other methods known in the art. See, for example, U.S. Pat. No. 3,996,029, which is incorporated herein by reference.

The following examples are presented to illustrate the invention. All parts and percentages are by weight unless otherwise indicated.

EXAMPLE 1

A 10-inch long, three-fourth inch diameter reaction vessel is packed with 40 grams of 8 to 10 mesh (U.S. Sieve Size) charcoal impregnated with 0.5 percent palladium. The palladium on carbon catalyst used is available from Englehard Industries. The reaction vessel is heated to 300° C. and purged with nitrogen for one hour.

The reaction vessel is cooled to 165° C. Hydrogen fluoride is introduced into the reaction vessel at the rate of 0.75 mole per hour. When the hydrogen fluoride flow stabilizes, sulfur dioxide is fed into the reaction vessel at the rate of 0.325 mole per hour. After flow rates stabilize, chlorine gas is introduced intially at a rate of 0.125 mole per hour, which is slowly increased to 0.25 mole per hour. The flow rates of the reactants are checked once again and adjusted as necessary to maintain the aforementioned flow rates. Nitrogen is also introduced at a rate of 0.78 mole per hour. The overall system pressure is maintained at 1.76 pounds per square inch gauge.

The introduction of reactants is continued for 81 hours. The product is analyzed at half-hour intervals with a gas chromatograph. A total of 54 grams of sulfuryl fluoride is produced for each gram of catalyst or 0.67 grams of $SO_2F_2$ produced per gram of catalyst per hour. No thionyl fluoride impurities are observed in the product.

Comparative Experiment

In an experiment otherwise similar to Example 1, coconut charcoal is employed as a catalyst. At a reaction temperature of 180° C., 42 grams of $SO_2F_2$ per gram of catalyst is produced at a rate of 0.51 grams of $SO_2F_2$ per hour. At lower temperatures both the total production and production rate decline.

What is claimed is:

1. In a process for preparing sulfuryl fluoride by the reaction of sulfur dioxide, chlorine and hydrogen fluoride, the improvement comprising the use of an effective amount of palladium, platinum, rhodium, rhenium, vanadium, chromium or salts thereof on a compatible support as a catalyst.

2. The process as described in claim 1 wherein the catalyst is palladium on a carbon support.

3. The process as described in claim 2 wherein palladium accounts for from about 0.2 to about 2.0 percent of the total weight of the supported catalyst.

4. The process as described in claim 3 wherein the reactants are present in mole ratios of from about 3:1 to about 3.5:1 for $HF:Cl_2$ and from about 2:1 to about 3:1 for $SO_2:Cl_2$.

5. The process as described in claim 4 wherein the reaction temperature is from about 150° to about 200° C.

6. The process as described in claim 5 wherein the catalyst support is activated carbon in the size range from about 5 to about 10 mesh.

* * * * *